United States Patent
Luca

(10) Patent No.: US 7,662,003 B2
(45) Date of Patent: Feb. 16, 2010

(54) ELECTRICAL PROPULSION AND/OR ELECTRICAL CURRENT GENERATION DEVICE ABOARD A MARINE CRAFT

(75) Inventor: Philippe Luca, La Teste de Buch (FR)

(73) Assignee: Nanni Industries, La Teste de Buch (FR)

( * ) Notice: Subject to any disclaimer, the term of this patent is extended or adjusted under 35 U.S.C. 154(b) by 0 days.

(21) Appl. No.: 11/651,519

(22) Filed: Jan. 10, 2007

(65) Prior Publication Data

US 2007/0202754 A1  Aug. 30, 2007

(30) Foreign Application Priority Data

Jan. 10, 2006  (FR) .................................... 06 00359

(51) Int. Cl.
*B60L 11/00* (2006.01)
*B63H 21/17* (2006.01)

(52) U.S. Cl. ......................................................... 440/6
(58) Field of Classification Search ...................... 440/6
See application file for complete search history.

(56) References Cited

U.S. PATENT DOCUMENTS 6,204,577 B1 * 3/2001 Chottiner et al. ............. 310/42
6,645,017 B1 11/2003 Skrzypek et al.
6,655,484 B2 * 12/2003 Levin ........................ 180/65.2
2004/0209532 A1 * 10/2004 Mori et al. ..................... 440/6

FOREIGN PATENT DOCUMENTS

| DE | 101 48 785 | 6/2002 |
|----|------------|--------|
| EP | 1 426 288 | 6/2004 |
| EP | 1 669 287 | 6/2006 |
| WO | WO 2005/032935 | 4/2005 |

* cited by examiner

*Primary Examiner*—Lars A Olson
*Assistant Examiner*—Daniel V Venne
(74) *Attorney, Agent, or Firm*—Young & Thompson

(57) ABSTRACT

A propulsion and/or electrical current generation device (26) in a marine craft, interposed between an engine block including a drive shaft (28) mounted on a bearing P1 and a reducing gear/reversing gear block (20) including a driven shaft (38) mounted on a bearing P2, characterized in that this generation device (26) includes a housing (40) that is connected to the engine block, a stator S that is integral with this housing, and a rotor R that is connected to the drive shaft (28), mounted on a bearing P3 that is arranged in the housing.

4 Claims, 4 Drawing Sheets

ELECTRICAL PROPULSION AND/OR ELECTRICAL CURRENT GENERATION DEVICE ABOARD A MARINE CRAFT

FIELD OF THE INVENTION

This invention relates to an electrical propulsion and/or electrical current generation device aboard a marine craft.

BACKGROUND OF THE INVENTION

In boating and more especially in recreational boating, accessories are more and more numerous and sophisticated, whereby onboard electronics, a microwave-equipped kitchen, television, pressurized water and other deck gear are powered by electricity.

Actually for most recreational craft, comfort is an essential criterion of choice.

This invention relates to limited capacity units without independent generating sets and with an "inboard" engine.

Motorized marine craft are distinguished from sailing craft and electrically-propelled craft.

In both cases, the engine is equipped with at least one alternator that allows the charging of the engine battery set. This engine battery set is used for engine functions and especially for starting.

Conversely, it is rarely large enough for services and comfort.

Moreover, in the case of a single set, a first problem arises when the engine battery set has been heavily loaded. Actually, when the engine is started, the alternator or alternators are subjected to a very strong demand for current for which they are not designed. This generally causes these charging means to be shut down, thus the propulsion is shut down.

Since the engine is critical for a motor craft and at least is a safety element for sailing craft, it would seem necessary to be able to divide the battery set into an engine battery set and a service battery set.

The former is generally composed of one or two high amperage batteries connected to an alternator, one for each engine if there are several engines.

The latter is generally composed of a larger number of batteries, optionally of different types and voltages, in order to have a high electric power storage capacity. It is then a good idea to be able to recharge these batteries.

In marine propulsion systems, for a propulsion system, the following are systematically found: an engine, a transmission, and a propeller or a turbine.

Transmissions are of different types and generally consist of a reducing gear, optionally a reversing gear, with a propeller drive by a direct shaft assembly or by a Sail-drive or Z-drive type.

Thus, the engine has an engine shaft output that is equipped with an inertial flywheel, this system being located in a standardized shroud to accommodate the different transmission types according to the different suppliers.

The coupling between the engine shaft that is equipped with its inertial flywheel and the transmission shaft is of the elastic type known under the name of "flector".

This makes it possible to absorb expansions, alignment tolerances, and vibrations.

To be able to meet the needs of electric power generation, one approach consists in interposing a large-sized generator between the engine and the transmission.

This has the advantage of not dictating design modifications of the marine craft, at the very most shifting the engine mount position on the order of 15 to 30 cm to provide an order of magnitude.

It is noted that this modification is minor on new constructions and can be easily performed on existing marine craft.

In terms of diameter, there is no problem of overcrowding in this area.

The prior art thus proposes in Patent Application WO 2005/032935 or EP 1 669 287 a generator that is interposed between the engine and the transmission.

Very numerous variants call for specific housings connected to the engine block, even specific flywheels; this requires major modifications on existing systems and on new engine systems that are modified according to whether they do or do not accommodate a generator.

Regardless of the arrangement adopted, there is a problem of operation.

Actually, the flywheel is carried by the drive shaft, therefore guided by a bearing mounted on the engine block. The rotors are connected to this flywheel and constitute a significant mass, 10 to 15 kg to give an order of magnitude, at the start. The stators are integral with the generator housing, this housing being connected to the engine output shroud, and the stators are located to the right of the rotors with an air gap of several tens of millimeters.

On the other hand, the elastic coupling makes it possible to drive the driven shaft that is itself carried by a bearing mounted on the reducing gear block.

It is noted that the rotors can undergo rotation with slight barrel deformation due to bending between the two bearings.

This barrel rotation is poorly compatible with the rotor/stator air gap of several tens of millimeters.

One major problem is therefore intermediate guidance.

SUMMARY OF THE INVENTION

Other problems that the invention aims to solve are the following:

reliability, critical at sea, a reduced number of parts, which enhances this reliability and limits costs, adaptability to what is standardized, engine and transmission, by limiting modifications, improvement of electricity production output by reducing the value of the air gap and precise adherence to this value, improvement of electricity production output while increasing rotor/stator masses, ease of generator installation/removal, and ease of rotor removal.

As indicated, the generator according to the invention makes it possible to charge a service battery set, but it can also be used as an electric engine, which is also proposed by this invention. In this case, for short-term operations requiring little power, it is possible to use the same generator in engine operation by means of disengaging the engine drive.

One concrete example relates to operation of a river vessel while waiting, then sailing through locks.

In fact, if the engine is disengaged while driving, the generator can also be used as a hydraulic generator, when the marine craft is propelled by another means, typically a sail during a cruise.

Thus, the generator according to this invention makes possible a certain versatility in installation and in the applications.

BRIEF DESCRIPTION OF THE DRAWINGS

The invention will now be described in detail according to one particular nonlimiting embodiment, and one variant, the accompanying drawings allowing illustration of the primary embodiment.

The figures of the drawings show.

DETAILED DESCRIPTION OF THE PREFERRED EMBODIMENTS

Figure 1:
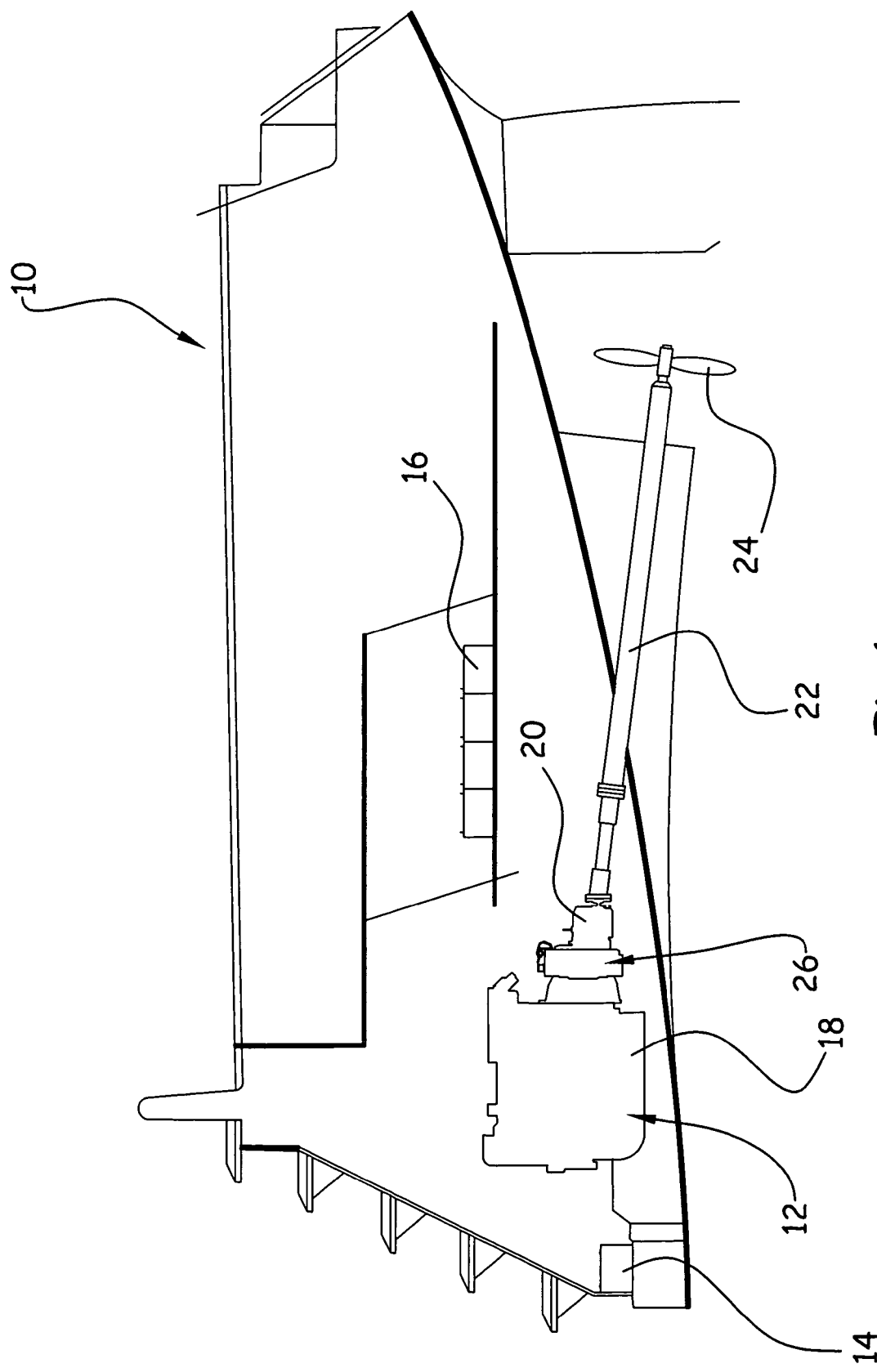
FIG. 1: a diagrammatic view of the installation of a generator, according to the invention, at the stem of a sailing craft, with a shaft assembly.

FIG. 1 shows a marine craft 10, in this case a sailboat, with propulsion 12, an engine battery set 14 and a service battery set 16.

The propulsion 12 comprises an engine 18, a reducing gear/reversing gear system 20, and a shaft assembly 22 equipped with a propeller 24 on its end. Such an installation is extremely well known.

The engine battery set 14 is directly recharged by the alternator of the engine, not shown, and likewise in the known manner.

The current generation device according to the invention, generally labelled 26, is interposed between the engine 18 and the reducing gear/reversing gear system 20, the engine 18 and the system 20 being themselves connected to the supports intended for this purpose in the hull of the marine craft.

Figure 2:
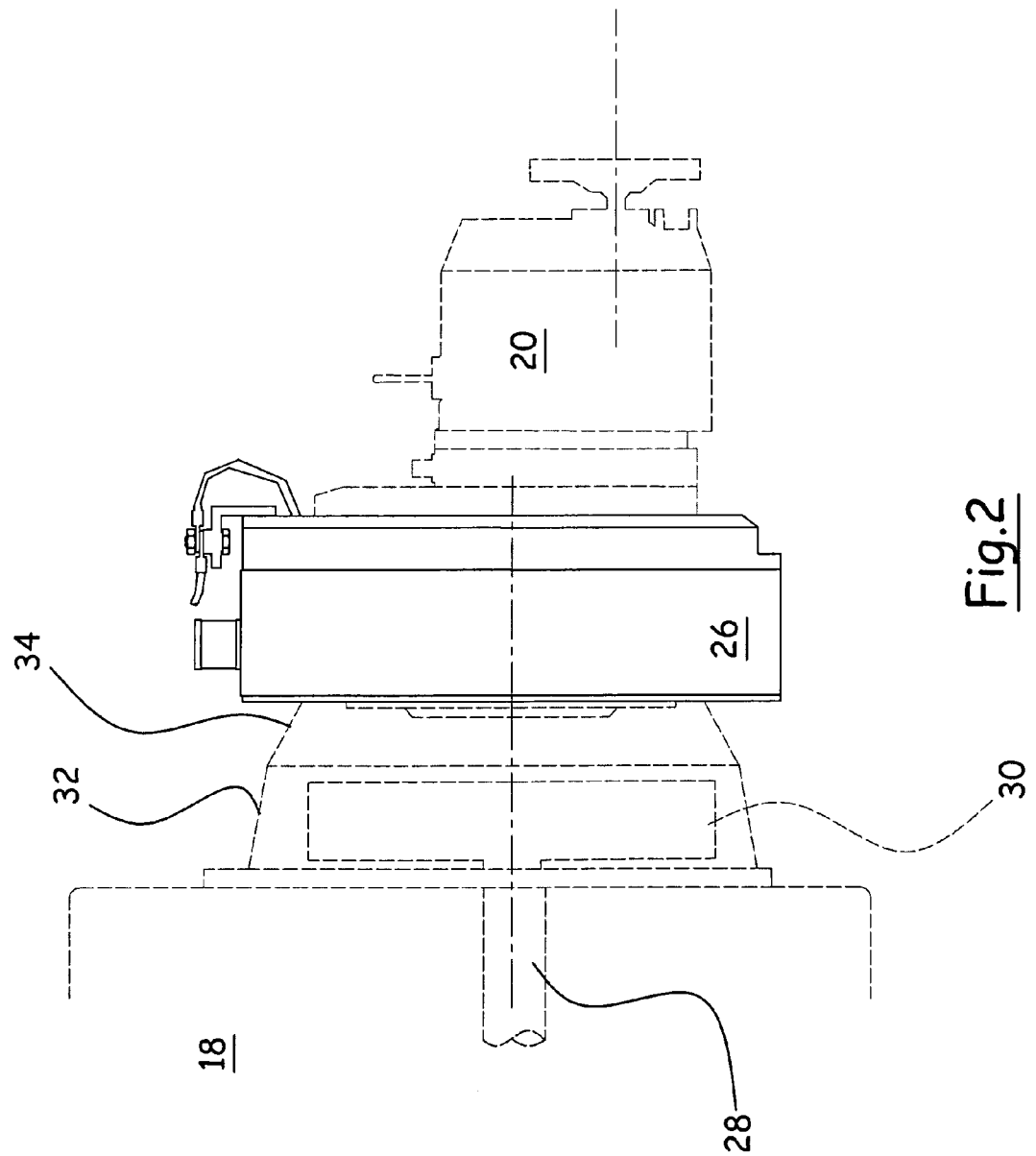
FIG. 2: a more detailed view of the positioning of the generator from FIG. 1, FIG. 3: a cutaway view of the installed generator.
Figure 3:
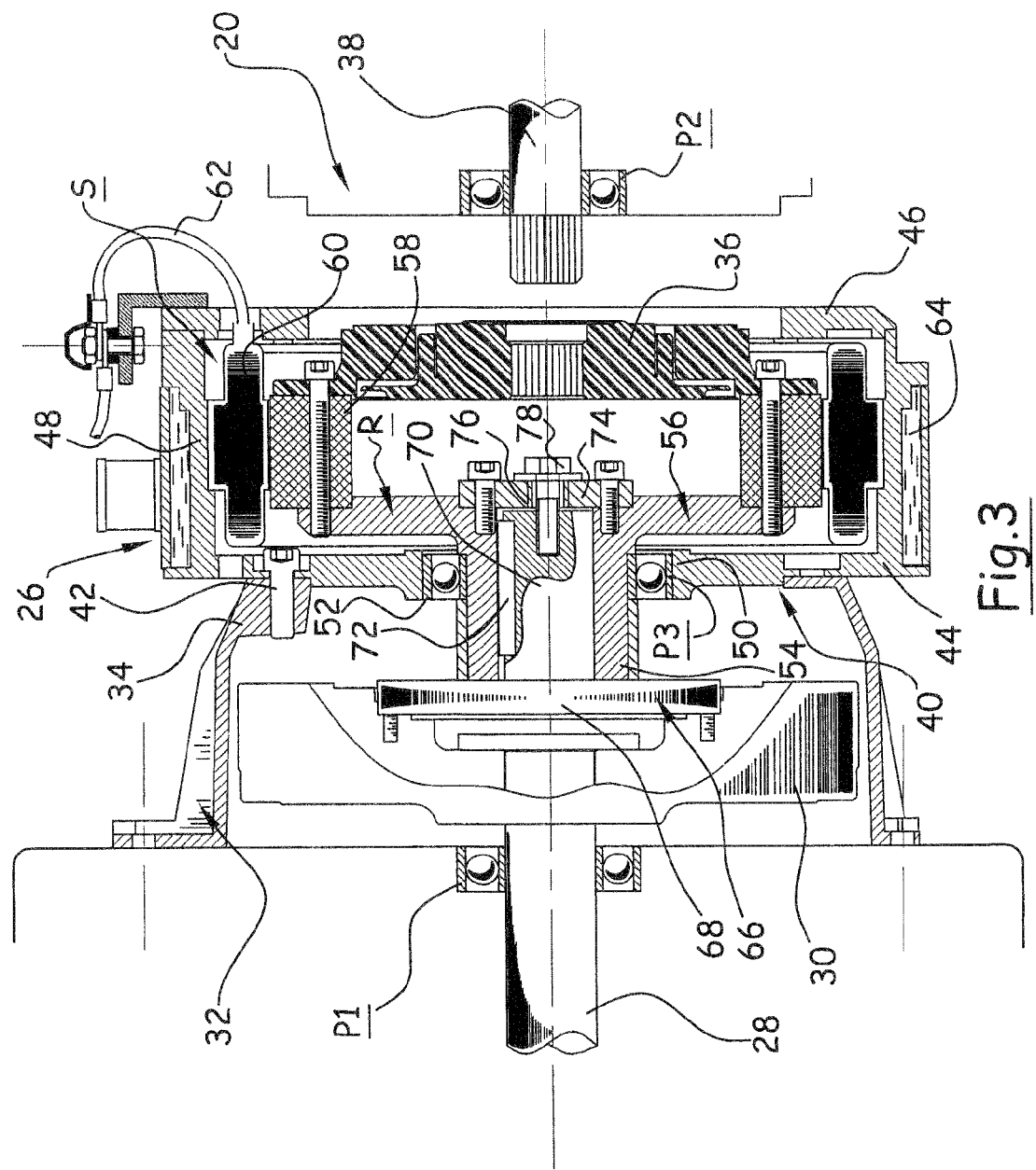

As indicated in FIGS. 2 and 3, the engine manufacturers provide engine blocks with a drive shaft 28 bearing a flywheel 30, this flywheel being placed in a shroud 32 that is connected to the engine block and having a flange 34, all of it being standardized.

More specifically with reference to FIG. 3, an elastic linkage 36 called a flector is provided in order to hold the driven shaft 38 of the reducing gear/reversing gear system 20, likewise standardized.

The generation device 26 is interposed directly between the drive shaft 28 and driven shaft 38 of the reducing gear/reversing gear system 20 by means of a longitudinal gap arranged between the two elements, generally displacement of the engine 18 toward the front of the marine craft, 150 to 200 mm to provide an order of magnitude.

In this FIG. 3, it is noted that the drive shaft 28 is fully guided by a bearing P1 and that the driven shaft 38 is fully guided by a bearing P2.

The electric current generation device 26 includes a housing 40 that is connected to the flange 34, standardized, of the shroud 32 by means of screws 42.

This housing 40 comprises a front flange 44 and a rear flange 46, the two being connected by an annular crosspiece 48. The diagrammatic breakdown done in this way allows easier reading, but these housing elements can advantageously come directly from molding.

The front flange 44 includes in its center a seat 50 that is designed to accommodate a bearing P3, in this case the external cage of a rolling bearing 52.

The internal cage of this rolling bearing 52 accommodates a hub composed of a hollow shaft 54 and a disk 56. This disk 56 bears magnetic parts 58 and constitutes the rotor R. The magnetic parts 58 of the rotor are designed to interact with coils 60 forming a stator S and are carried by the annular crosspiece 48.

Between the magnetic parts 58 of the rotor R and the coils 60 of the stator S an air gap e of several tens of millimeters is provided; this is not shown on the scale of the drawing.

The generated electric current is collected and routed through suitable cables 62 to the service battery set 16 by means of the interposition of suitable control, monitoring and safety means.

The rotor R is provided to accommodate the elastic linkage 36 called a flector.

This elastic linkage 36 is that which is provided to interact with the flywheel 30 when there is no interposed generation device 26; this linkage is maintained.

In the known manner, the flector comprises a central metallic insert that is designed to accommodate the end of the driven shaft 38, the coupling being of the spline type.

To dissipate the calories produced during operation, there is a cooling circuit 64, in the illustrated case, within the annular crosspiece 48.

A linkage part 66 is added to the generation device 26. This part includes a disk 68 that is designed to be screwed into the standard threaded holes in the flywheel 30 and a solid axle 70 that is designed to externally accommodate the hollow shaft 54 of the hub of the rotor R. A key 72 rotationally connects the solid axle and the hollow axle.

A plate 74 is screwed to the disk 56, said plate 74 comprising a central threaded hole 76.

Thus, a center screw 78 passes freely into this central threaded hole 76 and is screwed into a threaded hole of smaller diameter made in the solid axle 70.

This screw 78 alone prevents withdrawal of the rotor of the solid axle 70, then the rotary drive is ensured by the key 72.

As shown in FIG. 3, it is noted that the rotor R is fully guided to rotate by the bearing P3, but also by the bearing P1 through the flywheel 30 and the connecting part 66 that is integral with it.

The air gap e is necessarily observed because the stator S is carried by the housing 40 that is integral with the shroud 32, itself integral with the engine block carrying the bearing P1.

This arrangement allows installation of the generation device 26 directly on the shroud and the engine flywheel of the drive shaft, which are standard components, without any modification.

Likewise, the standard flector in which the splined driven shaft penetrates is maintained, this flector being now connected to the rotor R instead of being connected to the flywheel 30 of the drive shaft.

Figure 4:
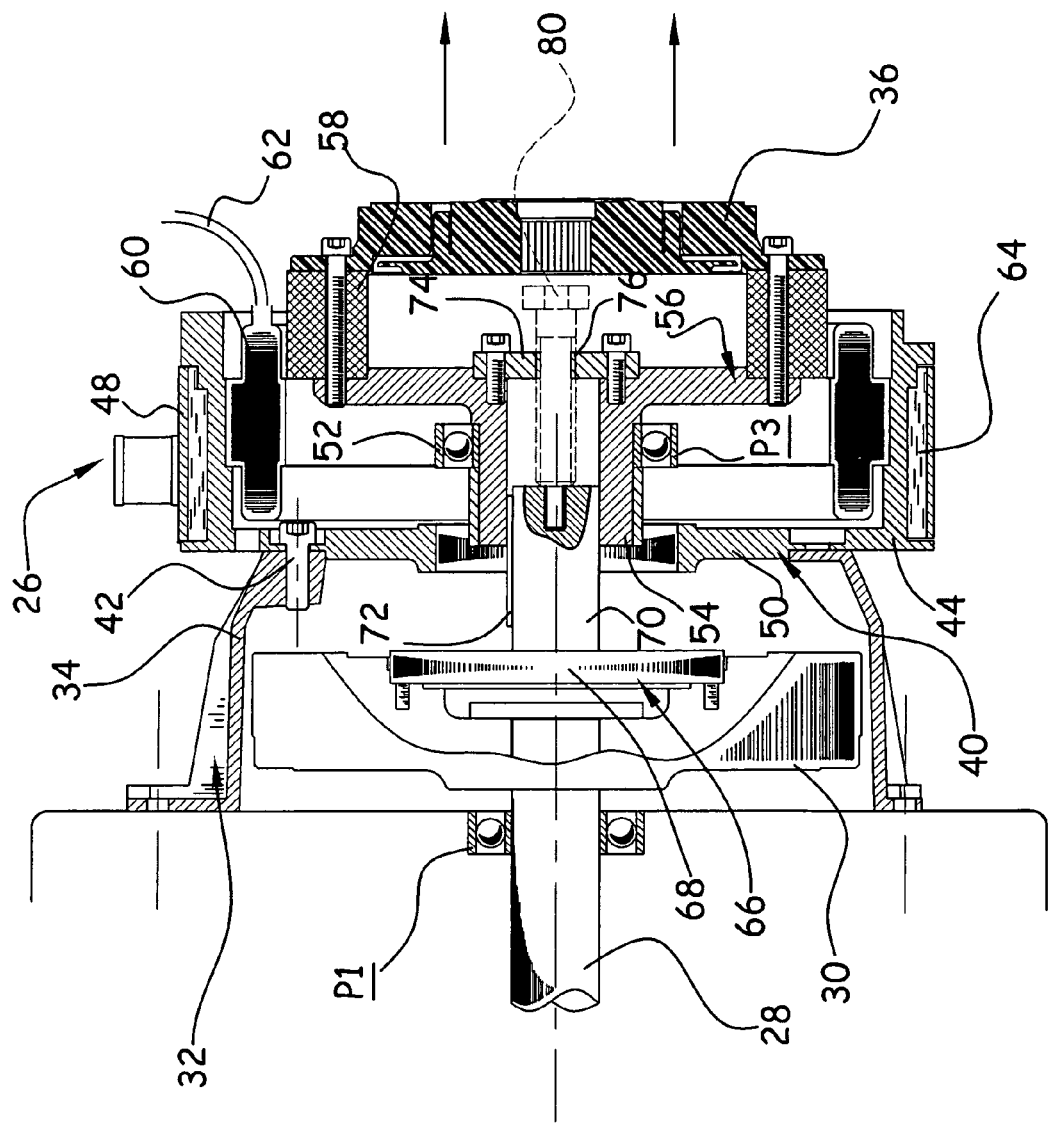
FIG. 4: a view of the removal of the rotor.

FIG. 4 makes it possible to note that it is easy to remove the rotor part R, i.e., the hub with its disk bearing the magnetic parts 58, outside of the housing 40 of the current generation device.

Once the reducing gear/reversing gear 20 has been disconnected and once the flange 46 has been removed, it is enough to remove the screw 78 in order to remove the rotor R with its bearing including the rolling bearing 52.

Often, withdrawal can require a major effort due to the key 72 and the magnetic attraction forces, several daN to provide a connection.

In this case, a screw 80 is inserted into the threaded hole 76. Since the diameter is larger, the screw 80 is supported on the end of the solid axle 70 of the linkage part.

By screwing in the screw 80, removal is made easy.

The invention also encompasses a current generation facility comprising the engine, the current generation device according to the invention, and the transmission, but with engagement/disengagement means of the engine drive, called a clutch, in order to enhance all functionalities.

According to one variant of the invention, it is possible to interpose this clutch between the drive shaft 28 and the generating device 26, more especially between the drive shaft 28 and the intermediate linkage part, or between the intermediate linkage part and the rotor.

Such means can come in the form of a simple dog clutch, a free wheel, or a centrifugal clutch, to cite only arrangements that are well known in mechanics.

The object is to engage or to disengage in driving the drive shaft 28 and the rotor R.

Thus, in the case of a sailboat cruising under sail, the propeller can allow driving of the reducing gear/reversing gear 20. The driven shaft 38 becomes the engine and entrains the rotor R allowing energy to be produced, the loss of speed of the marine craft remaining quite acceptable because the torque of the electric power generating device is reduced as soon as the mechanical inertia of the heat engine is removed.

Moreover, this slight loss of speed is generally not a decisive criterion since this type of heavily-equipped sailing vessel is of the recreational type and not the competition type.

In the case of a river-cruising motor vessel, a large amount of service power must be provided because the passengers are demanding and these cruises often take place with families.

In fact, there is a high storage capacity that is regularly renewed because river cruises take place at low speed, but over several hours.

Thus, for example, for certain activities such as generally long and numerous passages through locks, the heat engine is stopped and once disengaged, the pilot uses the electrical generation device in the reverse direction as an electric motor supplied by the service battery set 16.

The short duration of use and low power that are necessary allow such a use.

Such an electric power generating device can thus be of high power, even in a small unit, without damage to the engine or engines, with the possibility of hydraulic generation and electric propulsion by means of interposition of a clutch.

Guidance, besides the safety of operation and reliability gained, improves output by the establishment and maintenance of a reduced air gap.

The invention claimed is:

1. A propulsion and/or electrical current generation device in a marine craft, interposed between an engine block comprising a drive shaft that is mounted on a first bearing adjacent to said engine block and a reducing gear/reversing gear block comprising a driven shaft that is mounted on a second bearing adjacent to said gear block, said generation device comprises a housing that is connected to a standard shroud that is integral with the engine block, a stator that is integral with said housing, a flywheel on said drive shaft, and a rotor that is connected to the drive shaft, said rotor being mounted on a third bearing arranged on a bearing seat in said housing between said flywheel and said rotor, wherein the rotor comprises a hub with a hollow shaft and a disk, said disk bearing magnetic parts, wherein the rotor is connected to the drive shaft by a linkage part, wherein the linkage part comprises a disk that is designed to be connected to said flywheel, said flywheel being integral with the drive shaft, and a solid axle designed to externally accommodate the hollow shaft of the rotor, a key ensuring rotational linkage of said solid axle and said hollow shaft.

2. The electrical current generation device according to claim 1, wherein the disk is connected to the driven shaft of the reducing gear/reversing gear block by an elastic coupling.

3. The electrical current generation device according to claim 1, wherein the hub comprises a plate that is screwed to the disk, said plate comprising a central threaded hole, a center screw passing freely into said central threaded hole, said center screw being screwed into a threaded hole of smaller diameter made in said solid axle.

4. The electrical current generation device according to claim 1, wherein the housing carries coils forming the stator.

* * * * *